(12) United States Patent
Yamamoto

(10) Patent No.: US 10,669,106 B2
(45) Date of Patent: Jun. 2, 2020

(54) CARRIAGE TRANSPORT SYSTEM AND METHOD OF MANUFACTURING ARTICLE

(71) Applicant: CANON KABUSHIKI KAISHA, Tokyo (JP)

(72) Inventor: Takeshi Yamamoto, Fujisawa (JP)

(73) Assignee: CANON KABUSHIKI KAISHA, Tokyo (JP)

(\*) Notice: Subject to any disclaimer, the term of this patent is extended or adjusted under 35 U.S.C. 154(b) by 0 days.

(21) Appl. No.: 15/119,085

(22) PCT Filed: Apr. 14, 2015

(86) PCT No.: PCT/JP2015/061923
§ 371 (c)(1),
(2) Date: Aug. 15, 2016

(87) PCT Pub. No.: WO2015/159991
PCT Pub. Date: Oct. 22, 2015

(65) Prior Publication Data
US 2016/0355350 A1    Dec. 8, 2016

(30) Foreign Application Priority Data

Apr. 15, 2014 (JP) .................... 2014-083458

(51) Int. Cl.
*B65G 43/08* (2006.01)
*B65G 37/00* (2006.01)
(Continued)

(52) U.S. Cl.
CPC ............ *B65G 43/00* (2013.01); *B65G 37/00* (2013.01); *B65G 54/02* (2013.01); *G05B 19/4189* (2013.01); *B60L 13/03* (2013.01)

(58) Field of Classification Search
CPC .................................................. B65G 43/00
(Continued)

(56) References Cited

U.S. PATENT DOCUMENTS 5,024,315 A    6/1991  Ward
5,032,975 A    7/1991  Yamamoto et al.
(Continued)

FOREIGN PATENT DOCUMENTS

CN    1476963    2/2004
CN    101205014    6/2008
(Continued)

OTHER PUBLICATIONS

U.S. Appl. No. 15/199,251, filed Jun. 30, 2016 (Inventors: Koji Tomoda and Takeshi Yamamoto).
(Continued)

*Primary Examiner* — Gene O Crawford
*Assistant Examiner* — Lester Rushin, III
(74) *Attorney, Agent, or Firm* — Venable LLP

(57) ABSTRACT

A carriage transport system, including a transport path formed of a plurality of transporting modules; a plurality of lower-order controllers each configured to conduct drive control of a carriage on a covered transporting module among the plurality of transporting modules; and a higher-order controller configured to control the plurality of lower-order controllers, wherein the plurality of lower-order controllers each receive a drive instruction for the carriage on the transport path from the higher-order controller in advance, and when respectively receiving one-group transport instructions transmitted from the higher-order controller simultaneously at the same timing, the plurality of lower-order controllers each apply the drive instruction to one of the carriage that is present on the covered transporting module and the carriage that is to enter the covered transporting module in an order of entering the covered transporting module, to thereby conduct the drive control of the carriage.

11 Claims, 9 Drawing Sheets

(51) Int. Cl.
*G05B 19/418* (2006.01)
*B65G 54/02* (2006.01)
*B65G 43/00* (2006.01)
*B60L 13/03* (2006.01)

(58) Field of Classification Search
USPC .............. 198/575, 464.1, 464.3, 341.01, 571
See application file for complete search history.

(56) References Cited

U.S. PATENT DOCUMENTS

| | | | |
|---|---|---|---|
| 5,091,855 A | 2/1992 | Umehara et al. | |
| 5,136,222 A | 8/1992 | Yamamoto et al. | |
| 6,240,335 B1 * | 5/2001 | Wehrung | G05B 19/4182 198/571 |
| 8,502,422 B2 * | 8/2013 | Lykkegaard | H02K 41/031 198/805 |
| 8,626,329 B2 * | 1/2014 | Dickson | B23P 21/004 198/343.1 |
| 2005/0159854 A1 | 7/2005 | Hori et al. | |
| 2009/0238664 A1 | 9/2009 | Murata | |

FOREIGN PATENT DOCUMENTS

| | | |
|---|---|---|
| CN | 101837885 | 9/2010 |
| DE | 2905642 | 8/1979 |
| EP | 0622313 | 11/1994 |
| JP | S62-121505 | 6/1987 |
| JP | S63-148803 | 6/1988 |
| JP | H4-39684 | 6/1992 |
| JP | H06-261425 | 9/1994 |
| JP | 2637088 | 8/1997 |
| JP | 3249620 | 1/2002 |
| JP | 2014-123188 | 7/2014 |
| TW | 480377 | 3/2002 |

OTHER PUBLICATIONS

International Preliminary Report on Patentability issued Oct. 27, 2016 during prosecution of related International application No. PCT/JP2015/061923.
Chinese Office Action dated Oct. 9, 2017 during prosecution of related Chinese application No. 201580019164.1. (Whole English-language translation included.).
Chinese Office Action dated Nov. 19, 2019 during prosecution of related Chinese application No. 201810838341.4.

* cited by examiner

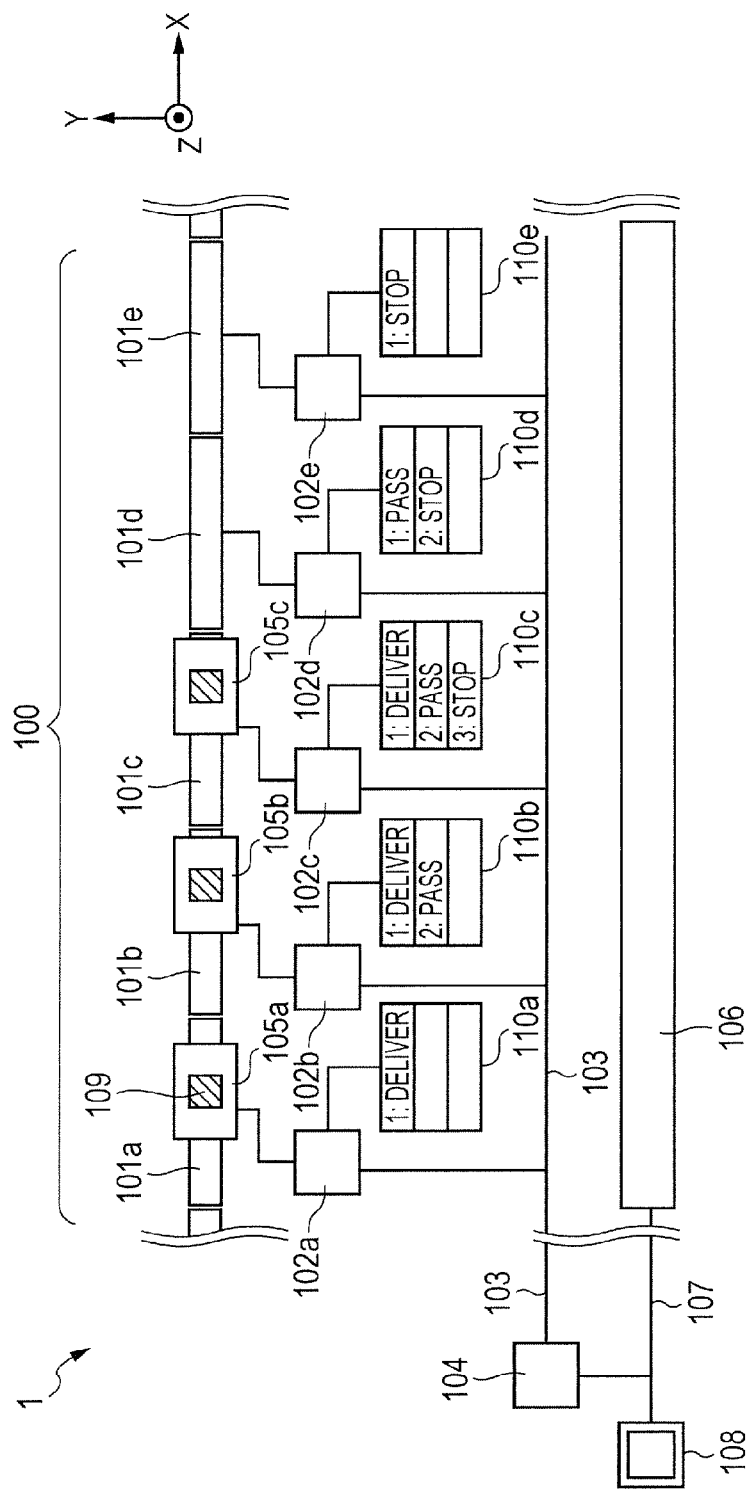

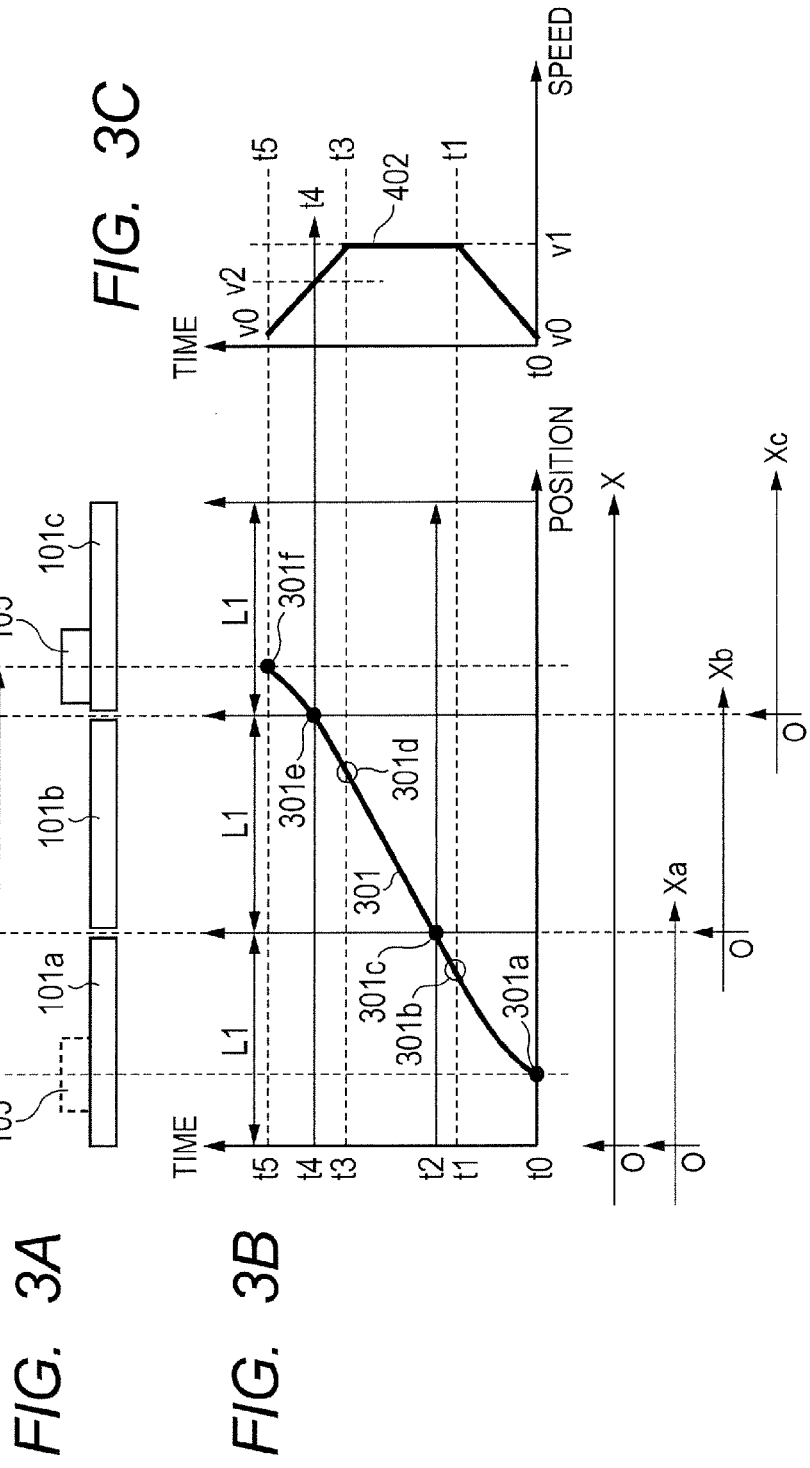

CARRIAGE TRANSPORT SYSTEM AND METHOD OF MANUFACTURING ARTICLE

This application is a national stage application under 35 U.S.C. § 371 of International Application No. PCT/JP2015/061923, having an International filing date of Apr. 14, 2015, which claims priority to Japan 2014-083458, filed on Apr. 15, 2014, the contents of each of which are incorporated by reference as if set forth in full herein.

TECHNICAL FIELD

The present invention relates to a carriage transport system and a method of manufacturing an article using the carriage transport system.

BACKGROUND ART

In general, in a factory-automated production line for assembling an industrial product, a transport system, which is configured to transport parts and the like within the production line or among a plurality of stations along the production line, is used.

In recent years, as this transport system, there is often used, due to its superiority in production efficiency, a transport system in which a transport line is divided into a plurality of control zones in each of which a control apparatus is located and between which a carriage is caused to travel.

Such a transport system is generally formed of a plurality of lower-order controllers configured to control the respective control zones and a higher-order controller connected by a communication system configured to couple to the plurality of lower-order controllers.

In a transport system disclosed in Patent Literature 1, stators of linear motors are located at predetermined intervals along a guide rail on which carriers are caused to travel, and a movable end of each linear motor is mounted to the carrier. The stator is excited by a motor driving device to generate a driving force or a braking force in the carrier.

A transport system disclosed in Patent Literature 2 includes a higher-order control section configured to centrally control a plurality of carriers that travel a transport path controlled by a plurality of control zones and a lower-order control section configured to control the carrier that travels the control zone. The lower-order control section controls a speed of the carrier within the own control zone based on a target average speed of the carrier that travels the own control zone and distance information on the own control zone.

CITATION LIST

Patent Literature

PTL 1: Japanese Patent No. 2637088
PTL 2: Japanese Patent No. 3249620

SUMMARY OF INVENTION

Technical Problem

However, the related-art transport system cannot always conduct high-speed and high-density transport of a carriage group.

It is object of the present invention to provide a carriage transport system capable of conducting high-speed and high-density transport and a method of manufacturing an article using the carriage transport system.

Solution to Problem

According to an embodiment, a carriage transport system, including: a transport path formed of a plurality of transporting modules; a plurality of lower-order controllers each configured to conduct drive control of a carriage on a covered transporting module among the plurality of transporting modules; and a higher-order controller configured to control the plurality of lower-order controllers, wherein the plurality of lower-order controllers each receive a drive instruction for the carriage on the transport path from the higher-order controller in advance, and when respectively receiving one-group transport instructions transmitted from the higher-order controller simultaneously at the same timing, the plurality of lower-order controllers each apply the drive instruction to one of the carriage that is present on the covered transporting module and the carriage that is to enter the covered transporting module in an order of entering the covered transporting module, to thereby conduct the drive control of the carriage.

Advantageous Effects of Invention

According to the one embodiment of the present invention, it is possible to transport the carriage group with high speed and high density.

Further features of the present invention will become apparent from the following description of exemplary embodiments with reference to the attached drawings.

BRIEF DESCRIPTION OF DRAWINGS

FIG. 1 is a schematic configuration diagram of a transport control system according to a first embodiment.

FIGS. 3A, 3B and 3C illustrate a transport profile of one carriage according to the first embodiment.

DESCRIPTION OF EMBODIMENTS

Figure 2A:
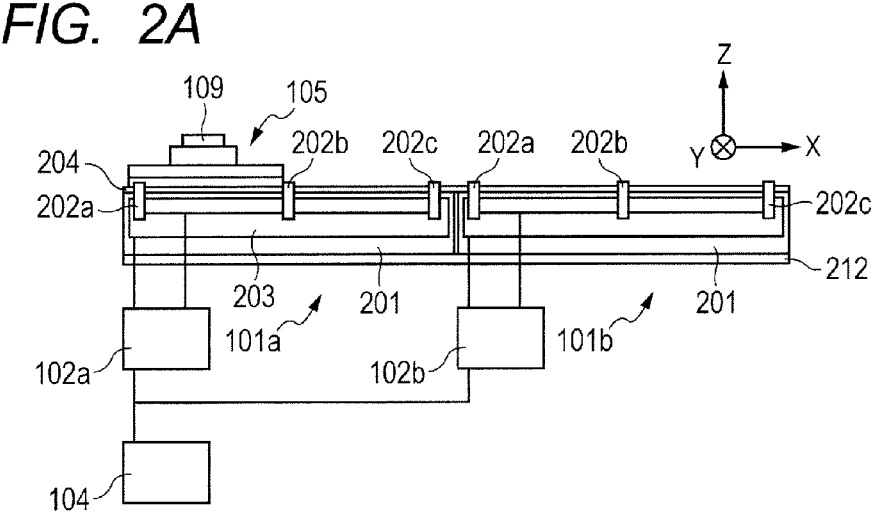
FIGS. 2A, 2B and 2C are schematic configuration diagrams of configurations of a transporting module and a carriage according to the first embodiment.

In a technique disclosed in Patent Literature 1, a unique number is assigned to each carriage, and a control instruction for the unique number is transmitted from a higher-order control section to a lower-order control section and stored therein. Each lower-order control section identifies the unique number of each carriage, and then controls each carriage in accordance with the control instruction corresponding to the identified unique number. Therefore, each lower-order control section needs to include an identification device.

Further, in the technique disclosed in Patent Literature 1, the carriage is controlled after the unique number of the carriage is identified, and hence it is difficult to transport respective carriages while transport timings thereof are synchronized. Therefore, it is difficult to control transport of a group of the plurality of carriages with high density and high speed.

In addition, in a technique disclosed in Patent Literature 2, during a slight period of time after the carriage has passed through the control zone until the subsequent carriage enters the control zone, it is necessary for the higher-order control section to confirm the passage of the carriage and notify of the subsequent transport instruction. Therefore, a high-speed communication unit is necessary in a case of transporting the carriage with high speed, and such a communication unit is usually extremely expensive.

For example, consideration is given to a case where a length of one control zone is 200 mm, a length of a carriage is 100 mm, an interval between a plurality of carriages is 310 mm in terms of a distance between centers thereof, and each carriage is transported with a speed of 2 m/s. In this case, a time period after the first carriage has completely left one control zone until the second carriage enters the control zone is only 5 msec. During the 5 msec, it is necessary for the lower-order control section to conduct a series of communications including notifying the higher-order control section of the passage of the first carriage, receiving a driving method for the second carriage, and further returning a notification of completion of the reception.

Further, in a case of coupling a plurality of control zones by a communication channel, one communication channel is shared by a plurality of control zones, and there is a problem in that the transport control of the carriage cannot be correctly conducted when a collision of communications occurs between a plurality of control zones during the mere 5 msec.

Preferred embodiments of the present invention will now be described in detail in accordance with the accompanying drawings.

First Embodiment

FIG. 1 is a schematic diagram of a part of a carriage transport system 1 including a transport path, a carriage, a lower-order controller, and a higher-order controller. Here, in FIG. 1 to FIG. 3C, an X-axis is set to a transport direction of the carriage, a Z-axis is set to a direction vertical to a rack on which a transporting module is placed, and a Y-axis is set as an axis orthogonal to each of the X-axis and the Z-axis.

The carriage transport system 1 includes a transport path 100 formed of a plurality of transporting modules 101 located on the rack so as to be coupled to one another and a plurality of lower-order controllers 102 respectively connected to the plurality of transporting modules 101 to control the connected transporting module 101. Further, the carriage transport system 1 includes a higher-order controller 104 configured to control the plurality of lower-order controllers 102 through a network 103 and a plurality of carriages 105 each configured to convey a work 109 on the transport path 100.

The plurality of lower-order controllers 102 are communicably connected to the higher-order controller 104 through the network 103, and each include a memory 110 configured to store a drive instruction sent from the higher-order controller 104. The lower-order controllers 102 each cover control of the connected transporting module 101, and each conduct the drive control of the carriage 105 that is present on the covered transporting module 101 or that has entered the covered transporting module 101 in the order of entry based on the drive instruction stored in the memory 110.

The carriage transport system 1 is used along with a process apparatus group 106 formed of a plurality of process apparatuses, and the plurality of carriages 105 move along the transport path 100 by receiving a driving force from the transporting module 101, to convey an object (work) 109 to be processed to each of the process apparatuses. Here, the respective process apparatuses of the process apparatus group 106 are connected to each other through a network 107 for the process apparatus, and are controlled by a process controller 108. Further, the process controller 108 is connected to the higher-order controller 104, and exchanges information therewith.

Note that, the transport path 100 illustrated in FIG. 1 is a part of an entire transport path, and only five transporting modules 101a to 101e, five lower-order controllers 102a to 102e, and three carriages 105a to 105c are extracted for the sake of brevity of description. The numbers of transporting modules, lower-order controllers, and carriages are not limited thereto.

Although described later in detail, the memory 110 of the lower-order controller 102 stores drive instructions for causing the lower-order controller 102 to control the carriages 105 that have entered the transporting module 101 in order. For example, it is assumed in FIG. 1 that the carriage 105c is first stopped on the transporting module 101c and is then delivered therefrom, the carriage 105b then passes through the transporting module 101c, and the carriage 105a is stopped on the transporting module 101c. Further, it is assumed that a memory 110c of the lower-order controller 102c stores the drive instructions of "1: deliver", "2: pass", and "3: stop" in the stated order. The lower-order controller 102c applies the drive instruction of "1: deliver" to the carriage 105c on the transporting module 101c to deliver the carriage 105c, and applies the drive instruction of "2: pass" to the carriage 105b that has next entered the transporting module 101c to pass the carriage 105b therethrough. Then, the lower-order controller 102c applies the drive instruction of "3: stop" to the carriage 105a that has next entered the transporting module 101c to stop the carriage 105a.

Figure 2B:
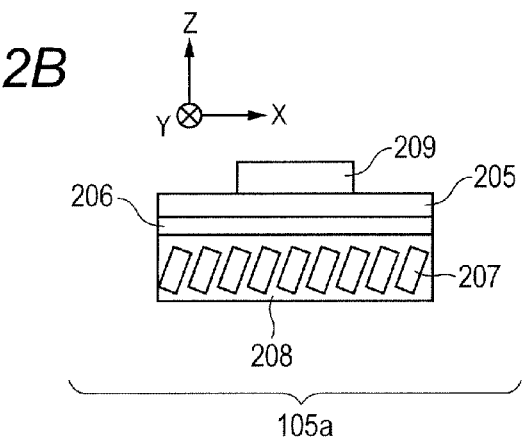
Figure 2C:
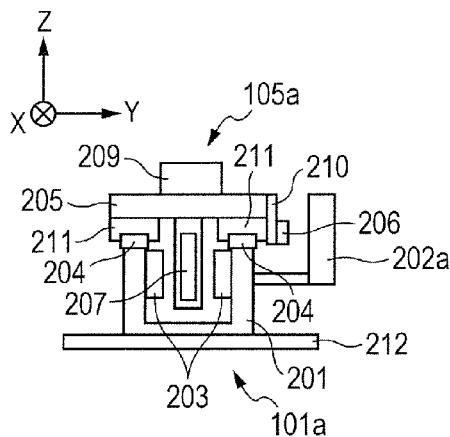

FIG. 2A to FIG. 2C illustrate two transporting modules 101a and 101b and one carriage 105, and configurations of the transporting module and the carriage are described in more detail with reference to FIG. 2A to FIG. 2C.

FIG. 2A is a diagram of the carriage 105 and the transporting modules 101a and 101b when viewed from a Y-axis direction, and FIG. 2B is a diagram of the carriage 105 when viewed from the Y-axis direction. Further, FIG. 2C is a diagram of the transporting module 101a and the carriage 105 when viewed from an X-axis direction.

As illustrated in FIG. 2A and FIG. 2C, the transporting module 101a includes a module casing 201, encoders 202a to 202c, a coil group 203, and a guide rail 204, and is connected to the lower-order controller 102a. The lower-order controller 102a is connected to a power supply (not illustrated). The number of encoders 202a to 202c and mounted positions thereof are adjusted appropriately in accordance with sizes of the carriage 105 and the transporting module 101a, accuracy in detection of the position of the carriage 105, and the like. Note that, the same applies to the configurations of the other transporting modules 101.

As illustrated in FIG. 2B and FIG. 2C, the carriage 105 includes a top board 205, a scale 206, a plurality of permanent magnets 207, a permanent magnet bracket 208, a work grasping mechanism 209, a scale bracket 210, and a guide block 211.

The permanent magnet bracket 208, the work grasping mechanism 209, the scale bracket 210, and the guide block 211 are mounted to the top board 205, and the plurality of permanent magnets 207 are mounted to one side or both sides of the permanent magnet bracket 208. Further, the scale 206 is mounted to the scale bracket 210, and the work grasping mechanism 209 grasps the work 109 on the top board 205.

The guide block 211 of the carriage 105 is guided by the guide rail 204 of the transporting module 101, and the carriage 105 is driven by an electromagnetic force produced between the carriage 105 and the coil group 203 mounted to the module casing 201 to be transported along the transport path 100 (X-axis).

The encoders 202a to 202c of the transporting module 101 are mounted to the module casing 201 in a plurality of positions so that gaps between each of the encoders 202a to 202c and the scale 206 of the carriage 105 are uniform. The encoders 202a to 202c are mounted at suitable intervals so as to be able to detect the carriage 105 wherever the carriage 105 is located within the transporting module 101.

The encoders 202a to 202c read a pattern of the scale 206 of the carriage 105, and detect an X-direction position (X-position) of the carriage 105 as a relative position from the encoders 202a to 202c. Then, the encoders 202a to 202c output information on the position of the carriage 105a to the lower-order controller 102a, and the lower-order controller 102 can learn where the carriage 105 is located on the covered transporting module 101 based on the information. Note that, the lower-order controller 102 may transmit the information to the higher-order controller 104.

Based on the drive instruction stored in the own memory 110, the lower-order controller 102 applies a current to the coil group 203 of the covered transporting module 101, and controls a current amount thereof. With this, the lower-order controller 102 transports the carriage 105 to a predetermined position on the covered transporting module 101 with a predetermined speed, or stops the carriage 105 at a predetermined position on the covered transporting module 101.

Further, the lower-order controller 102 can detect the fact that the carriage 105 has entered the covered transporting module 101 from the adjacent transporting module 101 based on the encoders 202a to 202c of the covered transporting module 101. Then, after the carriage 105 that has entered reaches a predetermined position of the covered transporting module 101, the lower-order controllers 102 conduct the transport control of carriages 105a to 105e based on control instructions within memories 110a to 110e. The predetermined position may be a boundary between the transporting modules 101. Further, the lower-order controller 102 may control the carriage 105 when the encoder 202 of the covered transporting module 101 reads the scale 206 of the carriage 105.

For example, assuming that the carriage 105 moves from the left to the right in FIG. 2A, the lower-order controller 102a controls the carriage 105 on the transporting module 101a when the encoder 202a of the transporting module 101a reads the scale 206 of the carriage 105. Further, after the carriage 105 enters the transporting module 101b, when the encoder 202a of the transporting module 101b reads the scale 206 of the carriage 105, the lower-order controller 102b controls the carriage 105 on the transporting module 101b.

Now, "one-group transport instruction" is described. The one-group transport instructions are drive instructions simultaneously sent from the higher-order controller 104 at the same timing to an entirety or a group of a plurality of lower-order controllers 102 configured to control an entirety or a part of a carriage group formed of a plurality of carriages 105. In other words, the one-group transport instruction is a cue for simultaneously starting operations (drive control of the carriages) of the plurality of lower-order controllers 102 that have received the one-group transport instructions.

When receiving the one-group transport instructions from the higher-order controller 104, the plurality of lower-order controllers 102 each apply in order the drive instruction stored in the memories 110 to the carriage 105 that is present on the covered transporting module 101 or that has entered the transporting module 101, to thereby start the drive control of the carriage 105.

Next, with reference to FIG. 3A to FIG. 3C, a method of transporting one carriage 105 between the plurality of transporting modules 101 is described. FIG. 3A is a schematic configuration diagram illustrating that one carriage 105 is transported across the three transporting modules 101a to 101c. Further, FIG. 3B illustrates a transport profile of the carriage 105 by assuming the X-position of the carriage 105 as a horizontal axis and time t as a vertical axis, and FIG. 3C illustrates a speed profile of the carriage 105 by assuming a speed v of the carriage 105 as the horizontal axis and time t as the vertical axis.

With this configuration, the control of the transport of the carriage 105 involves the lower-order controllers 102a to 102c connected to the three transporting modules 101a to 101c. It is assumed that the carriage 105 has stopped on the transporting module 101a in the first place, and the lower-order controllers 102a to 102c receive the one-group transport instructions from the higher-order controller 104 to start the transport control of the carriage 105. Note that, the memories 110a to 110c of the lower-order controllers 102a to 102c are assumed to store in advance the drive instructions of "1: deliver", "1: pass", and "1: stop".

The lower-order controller 102a applies the drive instruction of "1: deliver" stored in the memory 110 to the carriage 105 to transport the carriage 105 to the adjacent transporting module 101b. Note that, the lower-order controllers 102b and 102c have received the one-group transport instructions by this point in time, but have not conducted any operation because the carriage 105 has not entered the covered transporting module 101b or 101c.

After that, when the carriage 105 reaches the boundary between the transporting modules 101a and 101b, or when the encoder 202a of the transporting module 101b reads the scale 206 of the carriage 105, the control of the carriage 105 shifts from the lower-order controller 102a to the lower-order controller 102b.

After that, the lower-order controller 102b applies the drive instruction of "1: pass" stored in the memory 110 to the carriage 105 to transport the carriage 105 to the adjacent transporting module 101c.

After that, similarly, when the carriage 105 reaches the boundary between the transporting modules 101b and 101c, or when the encoder 202a of the transporting module 101c reads the scale 206 of the carriage 105, the control of the carriage 105 shifts to the lower-order controller 102c.

After that, the lower-order controller 102c applies the drive instruction of "1: stop" stored in the memory 110 to the carriage 105 to stop the carriage 105 at a predetermined position. In this manner, the carriage 105 is transported across the transporting modules 101a to 101c.

Next, a transport profile 301 of one carriage 105 is described. The transport profile 301 is a profile of the drive control conducted by one or more lower-order controllers 102a to 102c after one carriage 105 starts moving from a stopped state until the carriage 105 stops again.

As an example, FIG. 3B illustrates the transport profile 301 of one carriage 105. The carriage 105 is first stopped on the transporting module 101a, and is then transported to the transporting module 101c to stop on the transporting module 101c. As illustrated in FIG. 3B, the transport profile 301 starts at a point 301a and ends at a point 301f.

First, the carriage 105 starts moving with a speed v0 from the stopped state at a time t0, reaches a speed v1 (>v0) at a time t1, and reaches the boundary between the two transporting modules 101a and 101b at a time t2.

When entering the transporting module 101b at the time t2, the carriage 105 maintains the speed v1 until a time t3, and after that, while decelerating, passes through the boundary between the transporting modules 101b and 101c with a speed v2 (<v1) at a time t4.

Then, the carriage 105 passes through the boundary between the transporting modules 101b and 101c with the speed v2, and then decelerates to stop with the speed v0 at a time t5.

In FIG. 3B, points on the transport profile 301 are expressed as the point 301a at the time t0, a point 301b at the time t1, a point 301c at the time t2, a point 301d at the time t3, a point 301e at the time t4, and the point 301f at the time t5.

Here, in FIG. 3B, X indicates a coordinate system used to express positions within the transporting modules 101a to 101c when viewed in one common coordinate system, and Xa, Xb, and Xc indicate coordinate systems for positions within the transporting modules 101a, 101b, and 101c, respectively. Further, v indicates the speed of the carriage 105.

Attributes of X, Xa, Xb, Xc, and v can be expressed respectively by using the points on the transport profile 301 as arguments thereof. For example, "X(301a)" indicates an X-coordinate of the carriage 105 at the point 301a on the transport profile 301, and "Xa(301a)" indicates an Xa-coordinate of the carriage 105 at the point 301a on the transport profile 301. In the same manner, "V(301a)" indicates the speed of the carriage 105 at the point 301a on the transport profile 301.

Next, a trapezoidal drive profile is described. The "trapezoidal drive profile" uses one or more trapezoidal drive elements to express the drive control of the carriage 105 within each transporting module 101 conducted after the carriage 105 enters each transporting module 101.

Here, the "trapezoidal drive element" expresses a transporting state of the carriage 105 by a combination of a start position, a stop position, a start-position speed, and a stop-position speed. One trapezoidal drive element is put in parentheses ( ) for the sake of brevity of description, and is expressed as (start position, stop position, start-position speed, and stop-position speed). Further, trapezoidal drive elements for one carriage 105 put in braces { } in chronological order are set as the trapezoidal drive profile corresponding to the one carriage 105.

In addition, when a single one-group transport instruction is transmitted from the higher-order controller 104, one or more carriages 105 pass through or stop on one transporting module 101. Therefore, one or more trapezoidal drive profiles corresponding to one transporting module 101 is put in brackets [ ], and is set as "module drive instruction" corresponding to the one transporting module 101 or simply as "drive instruction".

The module drive instruction is transmitted from the higher-order controller 104 to the lower-order controller 102, to be stored in the memory 110. After that, when receiving the one-group transport instruction from the higher-order controller 104, the lower-order controller 102 conducts the drive control of the carriage in accordance with the trapezoidal drive profile of the module drive instruction stored in the memory.

For example, in FIG. 3B, the module drive instruction sent from the higher-order controller 104 to the lower-order controller 102a of the transporting module 101a before the one-group transport instruction is transmitted is described as,

[{(Xa(301a),Xa(301b),v0,v1),(Xa(301b),Xa(301c),v1,v1)}]  Expression 1.

When receiving this module drive instruction, the lower-order controller 102a stores the module drive instruction in the memory 110a.

Similarly, the module drive instruction sent to the lower-order controller 102b of the transporting module 101b is described as,

[{(Xb(301c),Xb(301d),v1,v1),(Xb(301d),Xb(301e),v1,v2)}]  Expression 2.

When receiving this module drive instruction, the lower-order controller 102b stores the module drive instruction in the memory 110b.

Further, the module drive instruction sent to the lower-order controller 102c of the transporting module 101c is described as,

[{(Xc(301e),Xc(301f),v2,v0)}]  Expression 3.

When receiving this module drive instruction, the lower-order controller 102c stores the module drive instruction in the memory 110c.

When the lower-order controllers 102a to 102c receive the one-group transport instruction from the higher-order controller 104, the transport of the carriage 105 is started, and the carriage 105 leaves the transporting module 101a, passes through the transporting module 101b, and stops on the transporting module 101c.

Figure 4A:
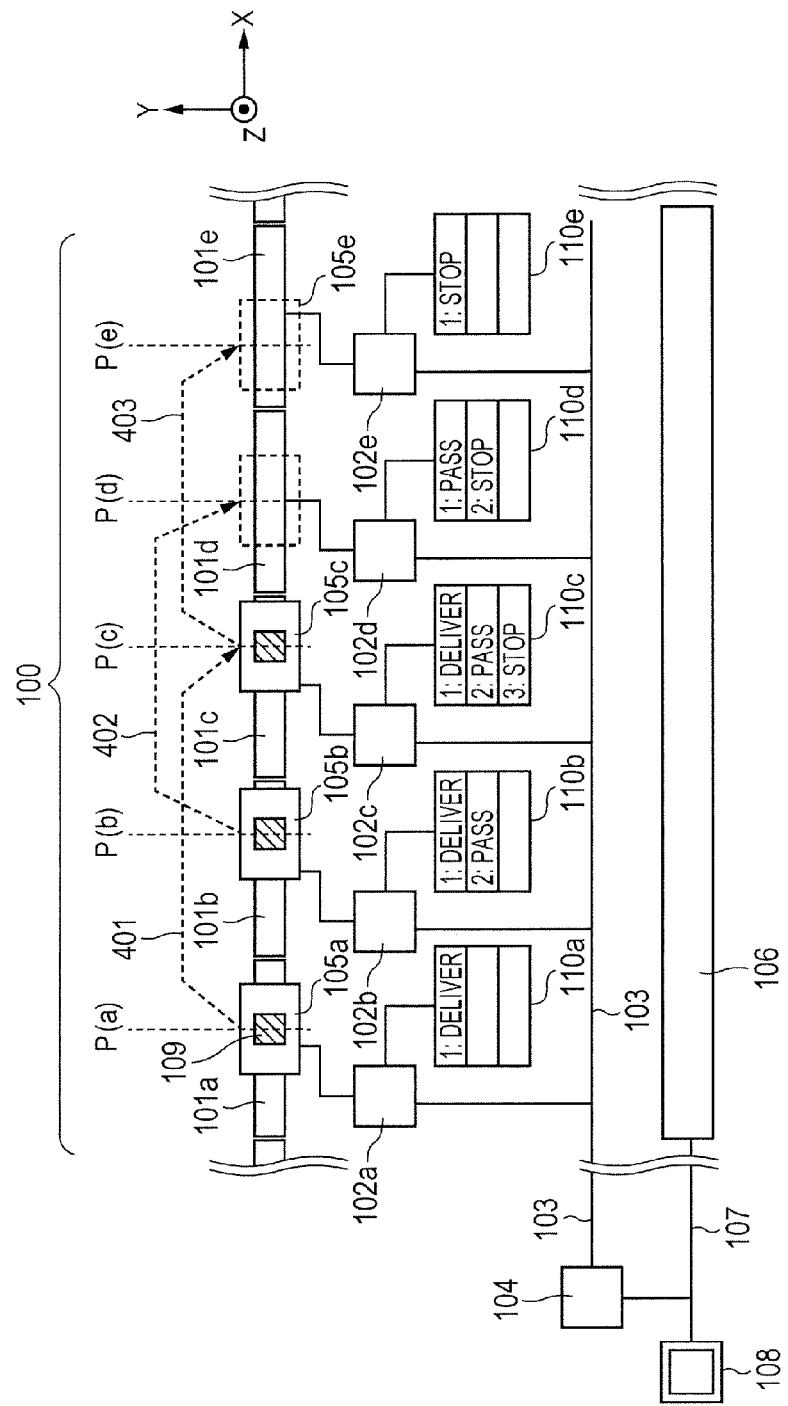
FIGS. 4A and 4B illustrate a transport profile relating to a plurality of carriages according to the first embodiment.
Figure 4B:
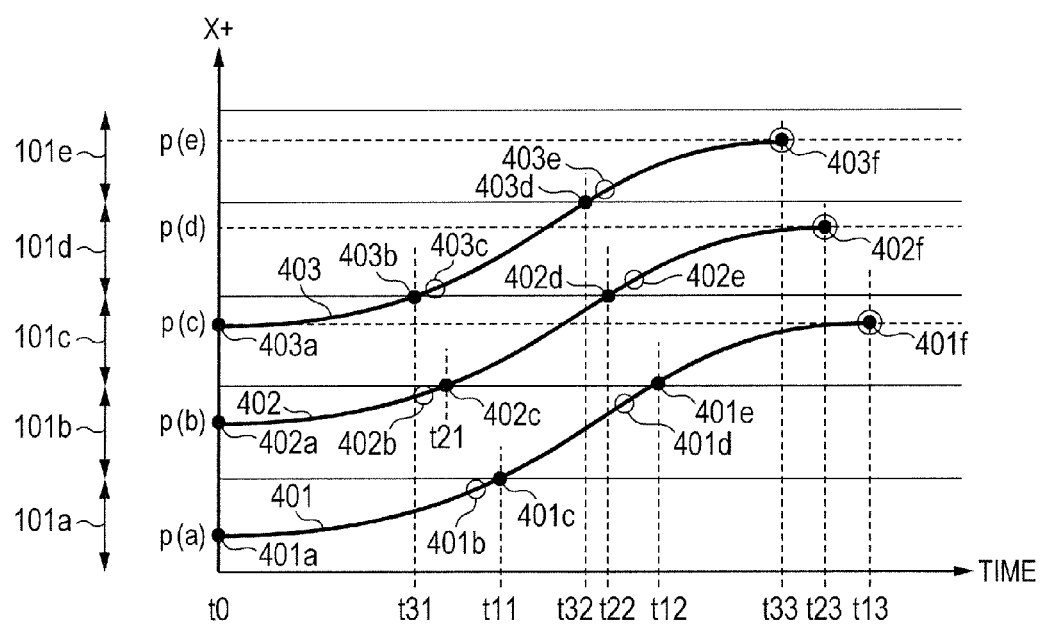

Next, with reference to FIG. 4A and FIG. 4B, the module drive instruction and the one-group transport instruction that are issued when the plurality of carriages 105a to 105c are transported are described.

FIG. 4A illustrates, in the same manner as FIG. 1, a state in which the carriages 105a to 105c are first stopped on the transporting modules 101a to 101c, respectively, among the transporting modules 101a to 101e, with no carriage on the transporting module 101d or 101e.

After that, the lower-order controllers 102a to 102e conduct the transport of the carriages 105a to 105c in accordance with the one-group transport instruction transmitted from the higher-order controller 104. Here, the carriages 105a to 105c are finally transported to the transporting modules 101c to 101e, respectively, and are stopped thereon.

FIG. 4B illustrates transport profiles 401 to 403 of the carriages 105a to 105c assuming that the horizontal axis indicates the time t and the vertical axis indicates the X-positions of the carriages 105a to 105c. In FIG. 4B, the time t0 is a time at which, as described later, the one-group transport instruction is sent from the higher-order controller 104 to the lower-order controllers 102a to 102e of the respective transporting modules 101a to 101e.

The transport profile 401 is a transport profile in which the carriage 105a that is present on the transporting module 101a is transported from a position P(a) to a position P(c) of the transporting module 101c. In the same manner, the transport profile 402 is a transport profile in which the carriage 105b that is present on the transporting module 101b is transported from a position P(b) to a position P(d) of the transporting module 101d. Further, the transport profile 403 is a transport profile in which the carriage 105c that is present on the transporting module 101c is transported from the position P(c) to a position P(e) of the transporting module 101e.

In this case, the module drive instruction sent to the lower-order controller 102a of the transporting module 101a is described as,

[{(Xa(401a),Xa(401b),V(401a),V(401b)),(Xa(401b), Xa(401c),V(401b),V(401c))}]   Expression 4.

Further, the module drive instruction sent to the lower-order controller 102b of the transporting module 101b is described as,

[{(Xb(402a),Xb(402b),V(402a),V(402b)),(Xb(402b), Xb(402c),V(402b),V(402c))},{(Xb(401c),Xb (401d),V(401c),V(401d)),(Xb(401d),Xb(401e),V (401d),V(401e))}]   Expression 5.

Further, the module drive instruction sent to the lower-order controller 102c of the transporting module 101c is described as,

[{(Xc(403a),Xc(403b),V(403a),V(403b))},{(Xc (402c),Xc(402d),V(402c),V(402d))},{(Xc(401e), Xc(401f),V(401e),V(401f))}]   Expression 6.

Further, the module drive instruction sent to the lower-order controller 102d of the transporting module 101d is described as,

[{(Xd(403b),Xd(403c),V(403b),V(403c)),(Xd(403c), Xd(403d),V(403c),V(403d))},{(Xd(402d),Xd (402e),V(402d),V(402e)),(Xd(402e),Xd(402f),V (402e),V(402f))}]   Expression 7.

In addition, the module drive instruction sent to the lower-order controller 102e of the transporting module 101e is described as,

[{(Xe(403d),Xe(403e),V(403d),V(403e)),(Xe(403e), Xe(403f),V(403e),V(403f))}]   Expression 8.

Such module transport instructions are stored in the memories 110a to 110e of the lower-order controllers 102a to 102e, and then the one-group transport instruction is transmitted from the higher-order controller 104 at the time t0. Then, the lower-order controllers 102a to 102e conduct the drive control of the carriages 105a to 105c in accordance with the respective module transport instructions, and transport the carriages 105a to 105c to the target positions P(c), P(d), and P(e), respectively.

After that, the lower-order controller 102a transmits the drive end signal to the higher-order controller 104 at a time t11 at which all the trapezoidal drive profiles within the module transport instruction have been processed. In the same manner, the drive end signal is transmitted to the higher-order controller 104 by the lower-order controller 102b at a time t12, by the lower-order controller 102c at a time t13, by the lower-order controller 102d at a time t32, and by the lower-order controller 102e at a time t33.

Here, in FIG. 1 and FIG. 4A, the "1: deliver" instruction is stored in a first area of the memory 110a of the lower-order controller 102a, and an entity thereof is a term in braces { } of Expression 4. Further, "1: deliver" and "2: pass" are stored in a first area and a second area, respectively, of the memory 110b of the lower-order controller 102b, and entities thereof are a term in first braces { } and a term in second braces { } of Expression 5. Further, "1: deliver", "2: pass", and "3: stop" are stored in a first area, a second area, and a third area, respectively, of the memory 110c of the lower-order controller 102c, and entities thereof are a term in first braces { }, a term in second braces { }, and a term in third braces { } of Expression 6. Further, "1: pass" and "2: stop" are stored in a first area and a second area, respectively, of the memory 110d of the lower-order controller 102d, and entities thereof are a term in first braces { } and a term in second braces { } of Expression 7. Then, "1: stop" is stored in a first area of the memory 110e of the lower-order controller 102e, and an entity thereof is a term in braces { } of Expression 8.

In this manner, the module drive instruction transmitted to a given lower-order controller among the plurality of lower-order controllers includes a trapezoidal drive profile corresponding to the carriage that is present on the transporting module covered by the given lower-order controller or that is to enter the transporting module, the trapezoidal drive profiles being arrayed in the order of entering the transporting module. Further, the trapezoidal drive profile includes a trapezoidal drive element corresponding to the carriage that is present on the transporting module covered by the given lower-order controller or that is to enter the transporting module, the trapezoidal drive elements being arrayed in chronological order.

Figure 5:
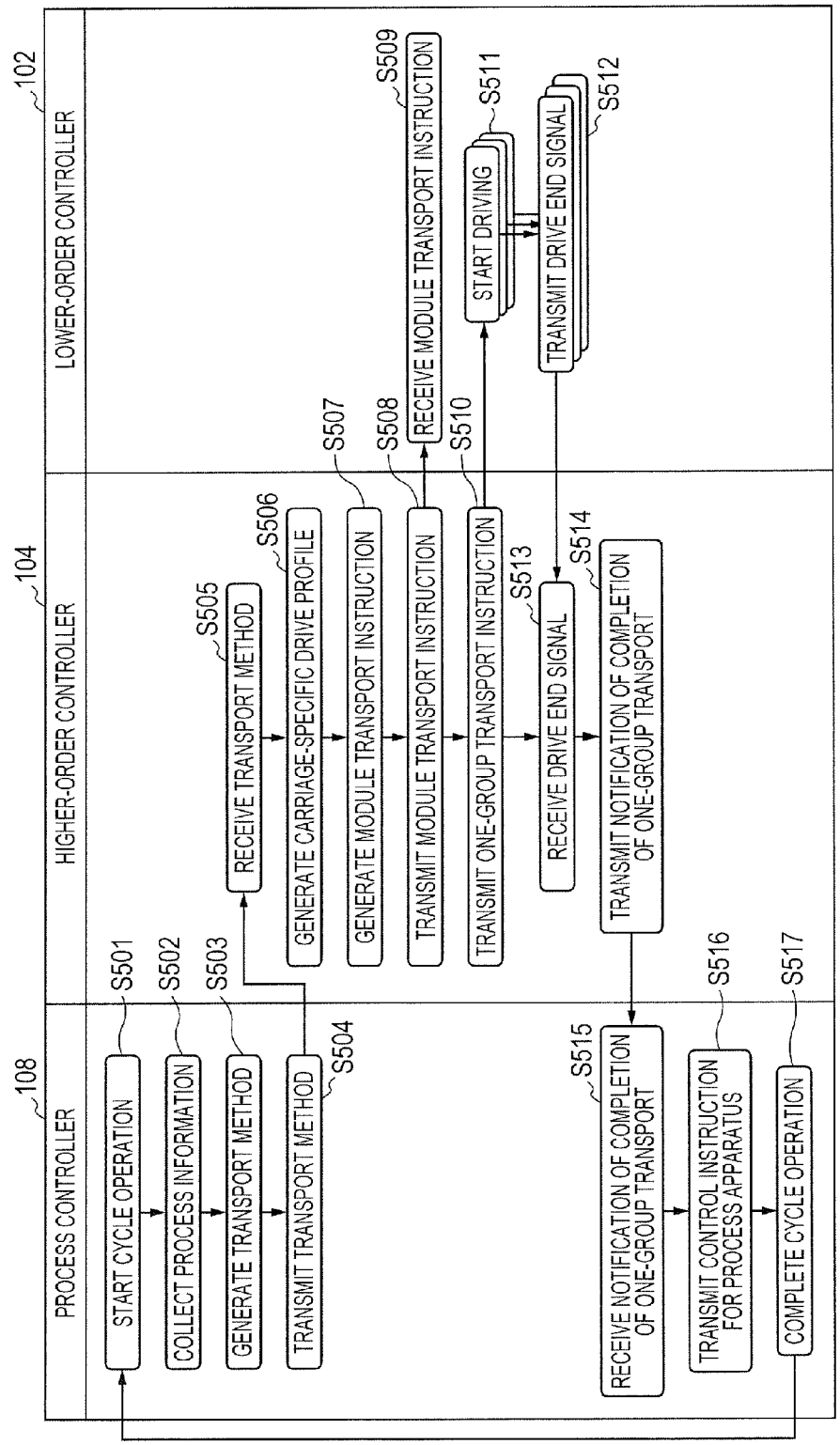
FIG. 5 is a timing chart of a cycle operation according to the first embodiment.

FIG. 5 is a timing chart of an operation conducted among the process controller 108, the higher-order controller 104, and the lower-order controller 102.

In general, a manufacturing process for an industrial product is configured so that a plurality of works 109 are transported on the transport path 100, while a plurality of process apparatuses of the process apparatus group 106 arrayed along the transport path 100 in a process order conduct machining for the work 109 in order.

Here, a job unit of the transport of the work 109 and the machining conducted by the process apparatus is referred to as "cycle operation", and the cycle operation is repeatedly conducted to thereby produce a product.

First, in Step S502, the process controller 108 collects process information on states of the work 109 on each carriage 105 and the process apparatus group 106. In Step S503, the process controller 108 generates a transport method for the carriage in accordance with the collected process information. For example, the works on the carriage group formed of the plurality of carriages 105 include one that is to be transported to a process of additionally conducting the machining if the machining is insufficient, transported to a process aimed at collection thereof, or transported in other such manner, and hence the transport method for the carriage 105 is reviewed for each cycle operation. In Step S504, the process controller 108 transmits the transport method for the carriage group formed of the plurality of carriages 105 to the higher-order controller 104.

In Step S505, the higher-order controller 104 receives the transport method for the carriage group. In Step S506, the higher-order controller 104 generates the trapezoidal drive profile for each carriage 105 based on the transport method for the carriage group. In Step S507, the higher-order controller 104 generates the module transport instruction by combining drive profiles of the respective carriages in terms of the module. In Step S508, the higher-order controller 104 transmits the module transport instruction including the trapezoidal drive profile to each lower-order controller 102.

In Step S509, the lower-order controller 102 receives the module transport instruction, and stores the module transport instruction in the memory. The lower-order controller 102 becomes ready to receive the one-group transport instruction from the higher-order controller 104. In Step S510, the higher-order controller 104 transmits the one-group transport instruction to each lower-order controller 102. In Step S511, when receiving the one-group transport instruction, the respective lower-order controllers 102 simultaneously start the drive control of the carriage. The lower-order controller 102 starts transporting the carriage 105 that is present on the covered transporting module 101, or applies the trapezoidal drive profile to the carriage 105 that has entered the transporting module 101 to transport or stop the carriage 105.

In Step S512, after completing application of all the trapezoidal drive profiles of the module transport instruction transmitted from the higher-order controller 104, the lower-order controllers 102 each transmit the drive end signal to the higher-order controller 104. When receiving the drive end signal from all the related lower-order controllers 102 in Step S513, the higher-order controller 104 transmits a notification of completion of one-group transport to the process controller 108 in Step S514.

In Step S515, the process controller 108 receives the notification of completion of one-group transport from the higher-order controller 104. In Step S516, the process controller 108 transmits the control instruction for the process apparatus corresponding to the process apparatus group 106, to cause the process apparatus to process the work 109. In this manner, one cycle operation is completed (S517). When one cycle operation is completed, the process controller 108 starts the subsequent cycle operation (S501 to S517).

According to this embodiment, the plurality of carriages can be transported in high-speed and high-density on the transport path, thereby improving productivity of the process apparatuses as a whole.

Second Embodiment

Figure 6:
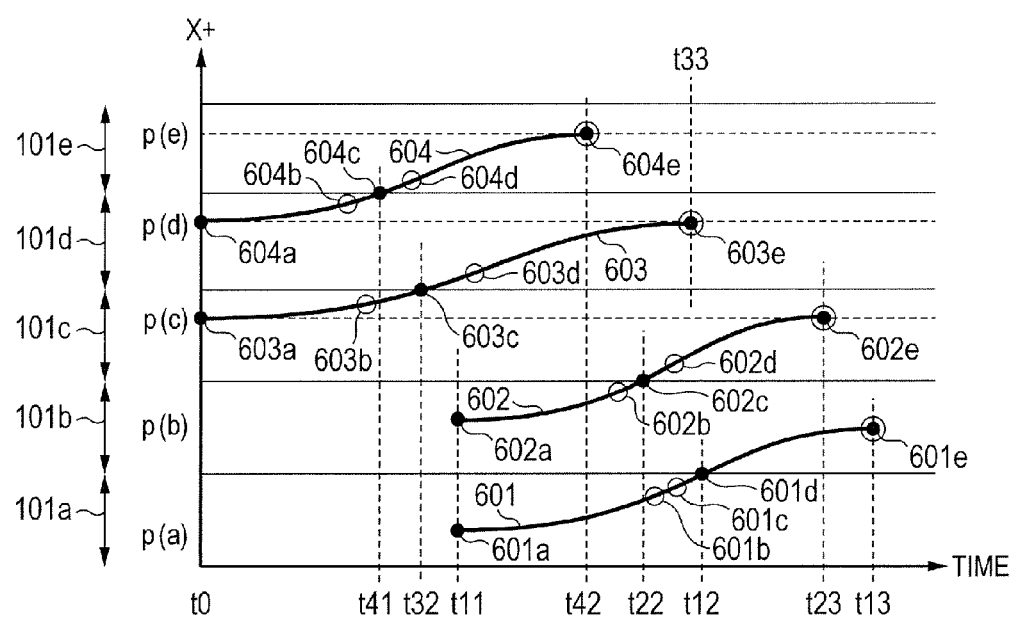
FIG. 6 illustrates a transport profile relating to a plurality of carriages according to a second embodiment.

With reference to FIG. 6, a carriage transport system according to a second embodiment of the present invention is described. This embodiment relates to a case where there are a plurality of carriage groups each formed of a plurality of carriages 105 on the transport path 100 and the one-group transport instruction is sent for each carriage group. Note that, the carriage transport system according to this embodiment has the same configuration as that of the first embodiment, and hence a description thereof is omitted.

In this embodiment, it is necessary to designate which of a plurality of one-group transport instructions the trapezoidal drive profile corresponds to, and hence a number indicating the one-group transport instruction is suffixed to the term in braces { } representing a one-group transport profile. FIG. 6 defines two one-group transport instructions, in other words, a one-group transport instruction "a" and a one-group transport instruction "b".

In FIG. 6, a case where four carriages 105 are first stopped on the transporting modules 101a to 101d and are respectively transported to the transporting modules adjacent thereto is assumed.

In FIG. 6, the module transport instruction sent to the lower-order controller 102a of the transporting module 101a is:

$$[\{(Xa(601a),Xa(601b),V(601a),V(601b)),(Xa(601b), Xa(601c),V(601b),V(601c)),(Xa(601c),Xa(601d),V(601c),V(601d)),b\}] \quad \text{Expression 9.}$$

With this expression, when receiving the one-group transport instruction "b", the lower-order controller 102a controls the transport of the carriage 105 based on Expression 9.

Further, the module transport instruction sent to the lower-order controller 102b of the transporting module 101b is:

$$[\{(Xb(602a),Xb(602b),V(602a),V(602b)),(Xb(602b), Xb(602c),V(602b),V(602c)),b\},\{(Xb(601d),Xb(601e),V(601d),V(601e)),b\}] \quad \text{Expression 10.}$$

With this expression, when receiving the one-group transport instruction "b", the lower-order controller 102b controls the transport of the carriage 105 based on Expression 10.

Further, the module transport instruction sent to the lower-order controller 102c of the transporting module 101c is:

$$[\{(Xc(603a),Xc(603b),V(603a),V(603b)),(Xc(603b), Xc(603c),V(603b),V(603c)),a\},\{(Xc(602c),Xc(602d),V(602c),V(602d)),(Xc(602d),Xc(602e),V(602d),V(602e)),b\}] \quad \text{Expression 11.}$$

In this expression, different numbers "a" and "b" indicating the one-group transport instructions are described. In other words, the lower-order controller 102c controls the drive of the carriage 105 based on a term in first braces { } of Expression 11 when receiving the one-group transport instruction "a", and controls the drive of the carriage 105 based on a term in second braces { } of Expression 11 when receiving the one-group transport instruction "b".

Further, the module transport instruction sent to the lower-order controller 102d of the transporting module 101d is:

$$[\{(Xd(604a),Xd(604b),V(604a),V(604b)),(Xd(604b), Xd(604c),V(604b),V(604c)),a\},\{(Xd(603c),Xd(603d),V(603c),V(603d)),(Xd(603d),Xd(603e),V(603d),V(603e)),a\}] \quad \text{Expression 12.}$$

With this expression, when receiving the one-group transport instruction "a", the lower-order controller 102d controls the transport of the carriage 105 based on Expression 12.

Further, the module transport instruction sent to the lower-order controller 102e of the transporting module 101e is:

$$[\{(Xe(604c),Xe(604d),V(604c),V(604d)),(Xe(604d), Xe(604e),V(604d),V(604e)),a\}] \quad \text{Expression 13.}$$

With this expression, when receiving the one-group transport instruction "a", the lower-order controller 102e controls the transport of the carriage 105 based on Expression 13.

Here, when the higher-order controller 104 transmits the one-group transport instruction "a" to the transporting modules 101c to 101e at the time t0, drive profiles 603 and 604 are executed to start the transport of the carriage 105. In the same manner, when the higher-order controller 104 transmits the one-group transport instruction "b" to the transporting modules 101a to 101c at the time t11, drive profiles 601 and 602 are executed to start the transport of the carriage 105.

After that, the lower-order controller 102a of the transporting module 101a transmits a drive end signal "b" corresponding to the number "b" of the one-group transport instruction "b" to the higher-order controller 104 at the time t12. In the same manner, the lower-order controller 102b of the transporting module 101b transmits the drive end signal "b" to the higher-order controller 104 at the time t13.

Further, the lower-order controller 102c of the transporting module 101c transmits a drive end signal "a" corresponding to the number "a" of the one-group transport instruction "a" to the higher-order controller 104 at a time t32, and transmits the drive end signal "b" corresponding to the number "b" of the one-group transport instruction "b" to the higher-order controller 104 at the time t23. Further, the lower-order controller 102d of the transporting module 101d transmits the drive end signal "a" to the higher-order controller 104 at the time t33, and the lower-order controller 102e of the transporting module 101e transmits the drive end signal "a" to the higher-order controller 104 at a time t42.

Figure 7:
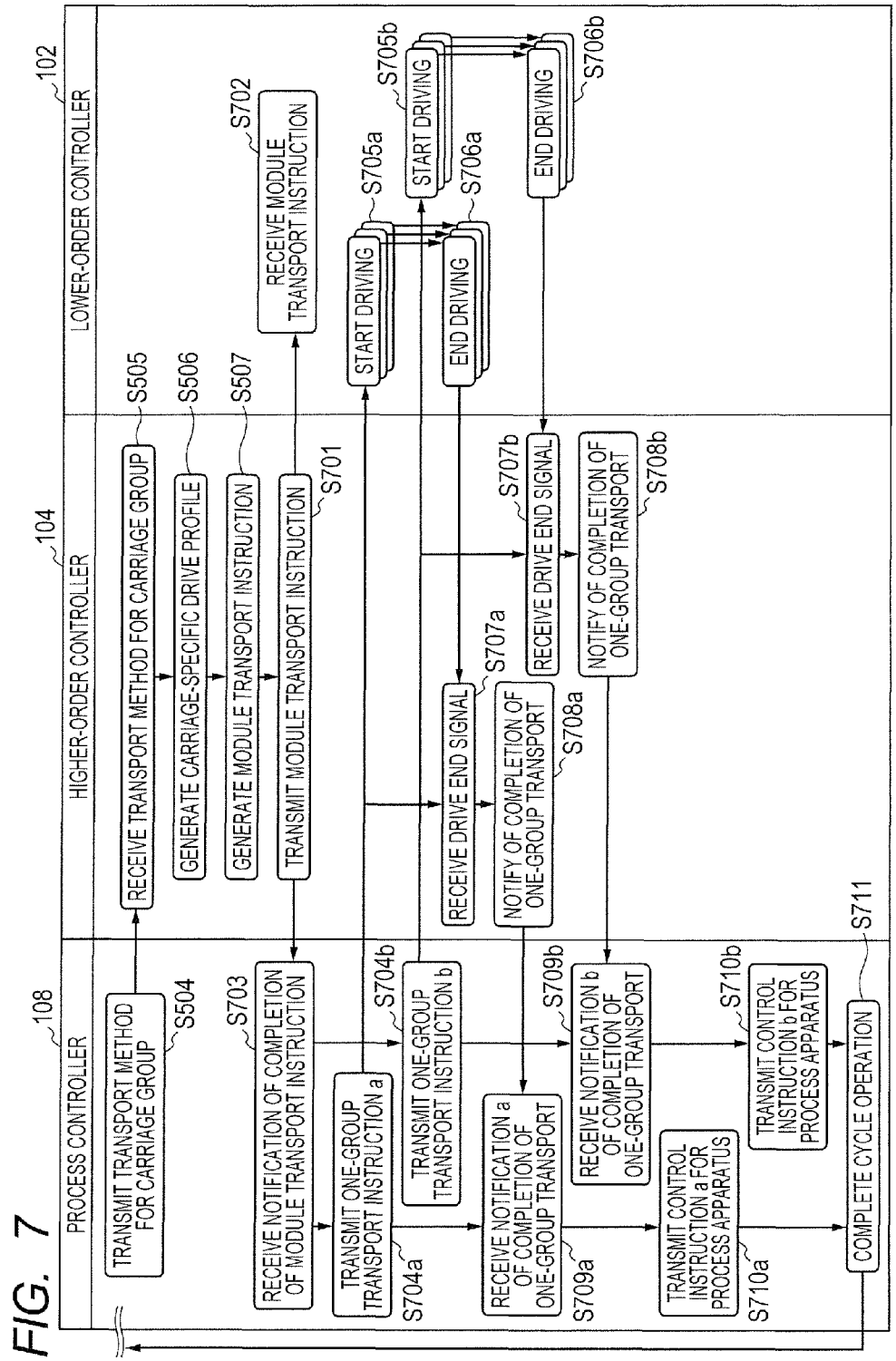
FIG. 7 is a timing chart of a cycle operation according to the second embodiment.

FIG. 7 is a timing chart of an operation conducted among the process controller 108, the higher-order controller 104, and the lower-order controller 102. This embodiment is different from the first embodiment in that the process controller 108 transmits the one-group transport instructions "a" and "b" to the lower-order controller 102. Note that, for the sake of brevity of description, in FIG. 7, the illustration of Steps S501 to S503 is omitted, and Steps S501 to S507 are the same as those of the first embodiment.

In Step S701, the higher-order controller 104 transmits the module transport instruction including the trapezoidal drive profile to each lower-order controller 102, and notifies the process controller 108 of completion of transmission of the module transport instruction. In Step S702, the lower-order controller 102 receives the module transport instruction, and stores the module transport instruction in the memory. In Step S703, the process controller 108 receives the notification of completion of transmission of the module transport instruction.

In Step S704a, the process controller 108 transmits the one-group transport instruction "a" to the lower-order controller 102. In Step S705a, the lower-order controller 102 having the trapezoidal drive profile relating to the one-group transport instruction "a" applies the trapezoidal drive profile to the carriage 105 that is present on the covered transporting module 101 or that is to enter the transporting module in the order of entering the transporting module, to conduct the drive control of the carriage 105. In the above-mentioned example, the lower-order controller 102c conducts the drive control of the carriage 105 on the transporting module 101c based on the term in first braces { } of Expression 11. Further, the lower-order controllers 102d and 102e conduct the drive control of the carriages 105 on the transporting modules 101d and 101e based on the trapezoidal drive profiles of Expression 12 and Expression 13, respectively.

In the same manner, in Step S704b, the process controller 108 transmits the one-group transport instruction "b" to the lower-order controller 102. In Step S705b, the lower-order controller 102 having the trapezoidal drive profile relating to the one-group transport instruction "b" applies the trapezoidal drive profile to the carriage 105 that is present on the covered transporting module 101 or that is to enter the transporting module in the order of entering the transporting module, to conduct the drive control of the carriage 105. In the above-mentioned example, the lower-order controller 102c conducts the drive control of the carriage 105 on the transporting module 101c based on the term in second braces { } of Expression 11. Further, the lower-order controllers 102a and 102b conduct the drive control of the carriages 105 on the transporting modules 101a and 101b based on the trapezoidal drive profiles of Expression 9 and Expression 10, respectively.

Note that, Steps S704a and S704b may be conducted at the same time, or may be conducted at an interval. For example, after the process controller 108 receives the notification of completion of one-group transport relating to the one-group transport instruction "a" in Step S709a, Steps S704b to S709b relating to the one-group transport instruction "b" may be conducted.

In Step S706a, after completing the application of the trapezoidal drive profile relating to the one-group transport instruction "a", the lower-order controllers 102 each transmit the drive end signal "a" to the higher-order controller 104. In Step S707a, the higher-order controller 104 receives the drive end signal "a" from the lower-order controller 102. In Step S708a, the higher-order controller 104 transmits a notification "a" of completion of one-group transport to the process controller 108. In Step S709a, the process controller 108 receives the notification "a" of completion of one-group transport from the higher-order controller 104. Note that, the same applies to Steps S706b to 709b, and hence descriptions thereof are omitted.

In Steps S710a and S710b, the process controller 108 transmits the control instruction for the process apparatus corresponding to the process apparatus group 106, to cause the process apparatus to process the work 109. In this manner, one cycle operation is completed (S711). When one cycle operation is completed, the process controller 108 starts the subsequent cycle operation (S501 to S507 and S701 to S711).

According to this embodiment, in addition to the advantages of the first embodiment, one-group transport can be conducted at different timings for each carriage group even when there are a plurality of carriage groups formed of the plurality of carriages on the transport path, thereby improving a production apparatus to a more efficient level.

Third Embodiment

Figure 8:
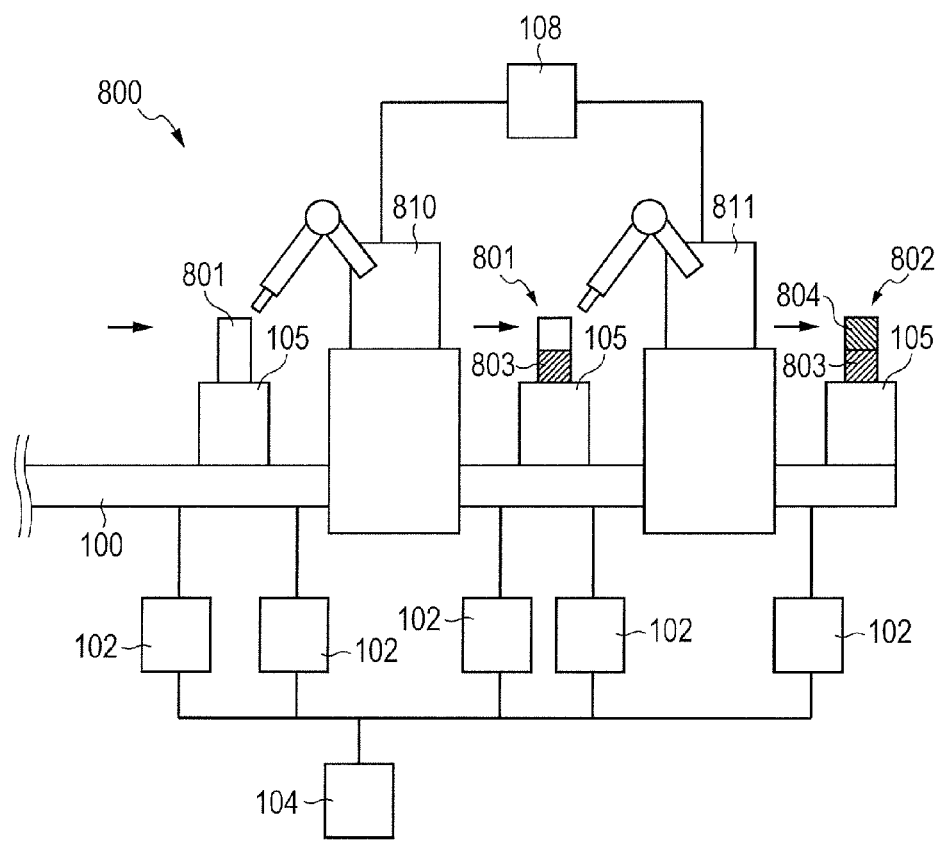
FIG. 8 is a schematic configuration diagram of a manufacturing system according to a third embodiment.

With reference to FIG. 8, a manufacturing system 800 for an article according to a third embodiment of the present invention is described. The manufacturing system 800 for an article includes the carriage transport system 1 according to the first or second embodiment and process apparatuses 810 and 811, and the carriage transport system 1 transports a work 801 between the process apparatuses 810 and 811. Here, the article includes, for example, a toner cartridge for an inkjet printer or a copying machine, parts of a camera, and a semiconductor product, or the like. Note that, the number of process apparatuses 810 and 811 is not limited thereto.

A manufacturing method for an article using the manufacturing system 800 is described. The higher-order controller 104 simultaneously transmits the one-group transport instructions to the plurality of lower-order controllers 102 at the same timing, and the lower-order controllers 102 receive the one-group transport instructions. In response thereto, the lower-order controller 102 applies the drive instruction received in advance from the higher-order controller 104 to the carriage 105 that is present on the covered transporting module or that is to enter the transporting module in the order of entering the transporting module, to transport the carriage 105 toward the first and second process apparatuses 810 and 811. The work 801 is grasped on the carriage 105, and the process apparatuses 810 and 811 to which the carriage 105 has been transported conducts a predetermined process for the work 801.

For example, in the case where the article to be manufactured is the toner cartridge for the inkjet printer, the work 801 is a cartridge for receiving a toner powder. Then, the process apparatus 810 conducts a process of inputting the toner powder 803 for color ink to the work 801, and the process apparatus 811 conducts a process of inputting the toner powder 804 for black ink to the work 801. Finally, an ink cartridge product is manufactured as an article 802.

In this manner, a manufacturing system for an article according to this embodiment allows the article to be manufactured along with the advantages of the transport systems according to the first and second embodiments. As a result, efficiency in manufacturing the article can be improved, thereby reducing manufacturing cost.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-083458, filed Apr. 15, 2014, which is hereby incorporated by reference herein in its entirety.

REFERENCE SIGNS LIST

1 . . . carriage transport system
100 . . . transport path
101 . . . transporting module
102 . . . lower-order controller
104 . . . higher-order controller
105 . . . carriage
106 . . . process apparatus group
108 . . . process controller

The invention claimed is:

1. A carriage transport system, comprising:
a transport path formed of a plurality of transporting modules, wherein each of the transporting modules has a controller and a memory;
a plurality of carriages configured to move along the transport path; and
a receiver configured to receive a transport instruction for starting moving the plurality of carriages, and to receive a plurality of drive instructions for instructing moving conditions for the plurality of carriages,
wherein the memory, before the receiver receives the transport instruction, preliminarily stores the plurality of drive instructions received by the receiver, and
wherein, after the controller receives the transport instruction received by the receiver, the controller corresponding to one of the plurality of transporting modules executes the plurality of drive instructions stored in the respective memory one by one in a predetermined sequential order with respect to the carriages entering an area of the transporting module corresponding to the controller.

2. The carriage transport system according to claim 1, wherein each of the drive instructions comprises a trapezoidal drive profile with respect to the carriage.

3. The carriage transport system according to claim 1, further comprising a second controller, different from the controllers of the transporting modules, configured to transmit the transport instruction,
wherein the controllers of the transporting modules transmit a drive end signal to the second controller when completing execution of all the drive instructions.

4. The carriage transport system according to claim 1, wherein:
each of the plurality of carriages comprises a permanent magnet;
each of the plurality of transporting modules comprises a coil group; and
the controller of the respective transporting module controls an amount of a current flowing through the coil group of the transporting module corresponding to the respective controller.

5. The carriage transport system according to claim 1, wherein the drive instructions stored in the controllers are transmitted from a second controller different from the controllers of the transporting modules, in advance.

6. The carriage transport system according to claim 1, further comprising a sensor configured to detect the carriage entering the transporting module.

7. The carriage transport system according to claim 1, wherein the controller of the respective transporting module controls the driving force applied to the plurality of carriages in accordance with the driving instructions.

8. A method of manufacturing an article using a carriage transport system and at least one process apparatus, the carriage transport system including:
a transport path formed of a plurality of transporting modules, wherein each of the transporting modules has a controller and a memory;
a plurality of carriages configured to move along the transport path; and
a receiver configured to receive a transport instruction for starting moving the plurality of carriages, and to receive a plurality of drive instructions for instructing moving conditions for the plurality of carriages,
wherein the memory, before the receiver receives the transport instruction, preliminarily stores the plurality of drive instructions received by the receiver,
the method comprising:
executing, after the controller receives the transport instruction received by the receiver, by the controller corresponding to one of the plurality of transporting modules, the plurality of drive instructions stored in the respective memory one by one in a predetermined sequential order with respect to the carriages entering an area of the transporting module corresponding to the controller; and conducting, by the process apparatus, a predetermined process for a work on the carriage.

9. The method of manufacturing the article according to claim 8, wherein:

each of the plurality of carriages comprises a permanent magnet;

each of the plurality of transporting modules comprises a coil group; and the respective controller of the transporting modules controls an amount of a current flowing through the coil group of the transporting module corresponding to the respective controller.

10. The method of manufacturing according to claim 8, wherein the plurality of drive instructions stored in the respective memory of the transporting modules are transmitted from a second controller different from the controllers of the transporting modules, in advance.

11. The method of manufacturing the article according to claim 8, wherein the controller of the respective transporting module controls the driving force applied to the plurality of carriages in accordance with the driving instructions.

\* \* \* \* \*